March 11, 1958 T. A. FORSTEN ET AL 2,826,061
DEVICE FOR MEASURING THE PERCENTAGE
OF SOLID MATTER IN A LIQUID
Filed Nov. 29, 1952 2 Sheets-Sheet 1

INVENTORS
Tauno Anselm Forstén
Matti Johannes Jalkanen
BY:

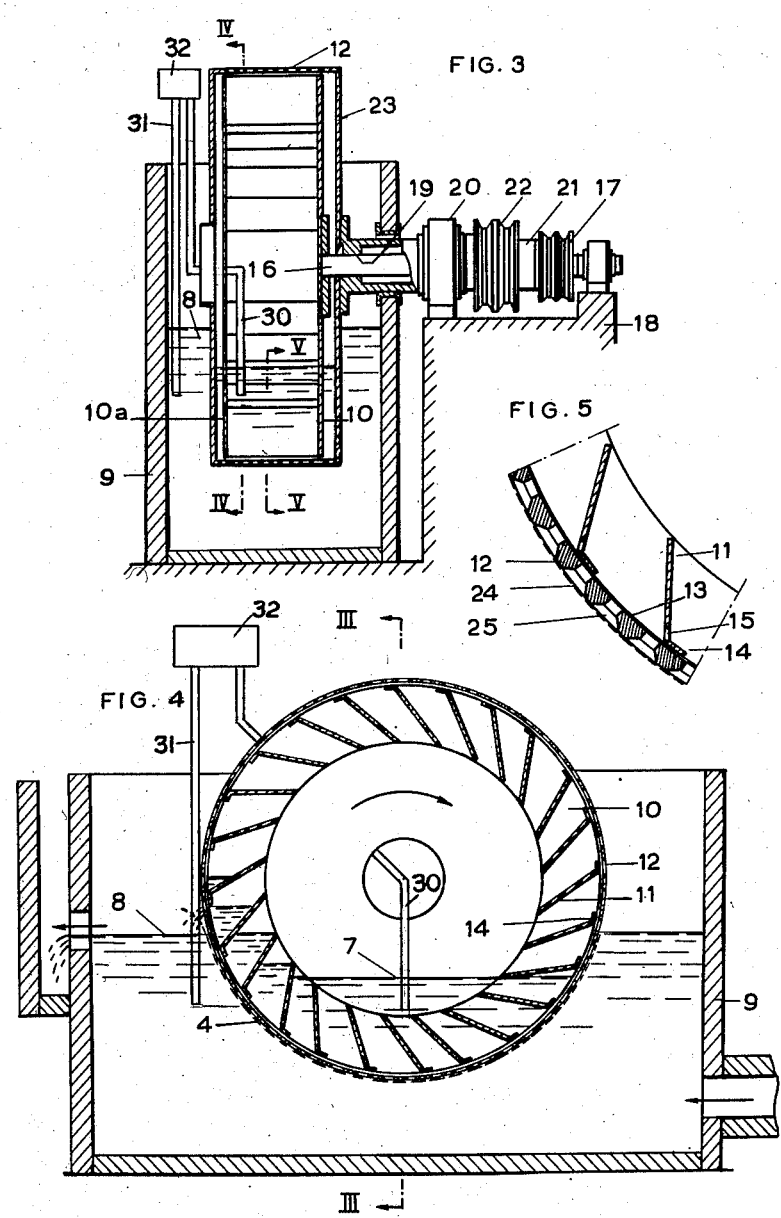

United States Patent Office 2,826,061
Patented Mar. 11, 1958

2,826,061

DEVICE FOR MEASURING THE PERCENTAGE OF SOLID MATTER IN A LIQUID

Tauno Anselmi Forsten and Matti Johannes Jalkanen, Rauma, Finland

Application November 29, 1952, Serial No. 323,302

Claims priority, application Finland March 14, 1952

13 Claims. (Cl. 73—63)

The present invention relates to an impulse responsive means for continuously measuring the percentage or quantity of solid matter in a liquid, i. e., the consistency degree. The invention can be adapted particularly for use in conjunction with dilute suspensions and thin stock having a consistency under 2 percent, specifically within the range from 0.3 percent to 1.5 percent.

More particularly, it is the object of the invention to provide a method for measuring the consistency degree of stock which forms upon a screen surface a layer or sheet affecting liquid permeability and the novel features of the present invention include the provision of a drum or cylinder rotating with fixed speed about a horizontal shaft and submerged partly in stock brought to a fixed level, the drum having on the periphery thereof a screen surface and in the interior thereof liquid exit means. The liquid quantity straining into the drum through the screen surface is adapted to be regulated by the layer of solid matter formed on the screen surface from the suspension and the liquid quantity discharges from the drum by the capacity of the exit means, thereby establishing a state of equilibrium between the liquid flowing into and out of the drum, which is evidenced as a hydraulic head between liquid levels within and outside the drum, said hydraulic head establishing the said equilibrium between liquid flows and constituting a quantity proportional to consistency when stock properties otherwise remain unchanged.

Figure 1:
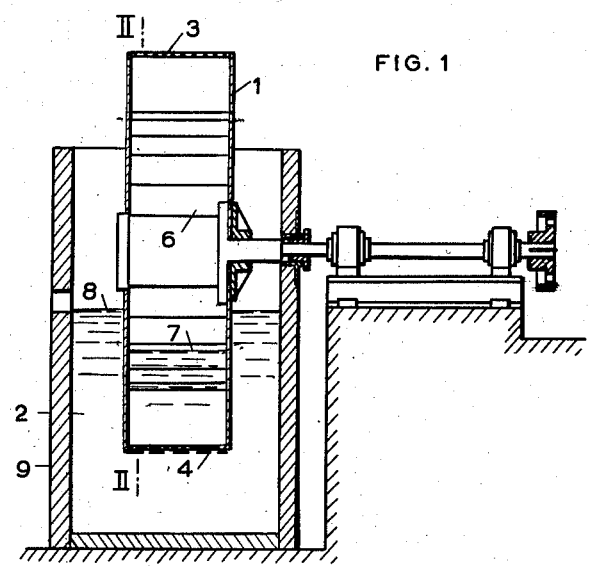
Figure 2:
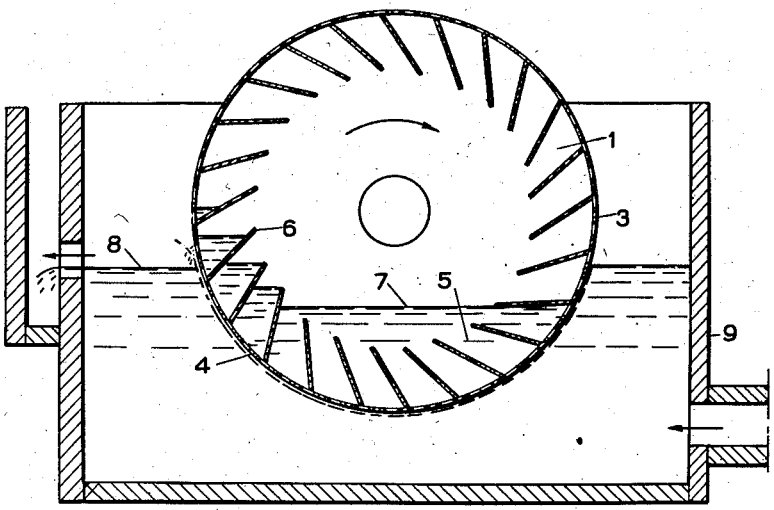

For the better understanding of the invention two impulse responsive apparatuses as applied to determining the consistency degree of a fibrous suspension and thin stock and embodying the invention are shown by way of example in the accompanying drawing, wherein Fig. 1 is a side view of a unit partly in section, Fig. 2 is a sectional view taken on line II—II of Fig. 1, Fig. 3 is a side view partly in section of another unit embodying the invention and Fig. 4 is a sectional view on line IV—IV of Fig. 3.

Fig. 5 is a sectional view on line V—V of Fig. 3, on a different scale.

The consistency measuring device comprises a drum or cylinder 1, arranged to rotate in fibrous suspension 2 on fixed level and under observation. The water of the fibrous suspension strains through a screen 3 and a fibrous layer collecting thereon during the rotation of the drum flows into the drum to form an aqueous layer 5. Water exit ducts 6 are arranged in the drum interior, the position and size of said ducts being such that the same are adapted to move beneath water level 7 while lifting the water quantity determined by the rotation speed of the drum above level of the fibrous suspension. Water drains off through the screen 3 dislodging the fibrous layer 4 formed on the screen surface and mixes with the water discharged from the drum and the fibrous suspension discharged from vat 9.

Because the water level 7 is continuously maintained at such a height as to cause the ducts 6 to move thereunder and the screen drum 1 is adapted to rotate with constant speed, it follows that the water discharging capacity of the ducts also remains constant.

If the fibre content or consistency of the suspension changes, the water level 7 within the drum will also change so that the greater the fibre content of the suspension becomes, the thicker will be the pulp layer 4. Consequently the inflow of water into the drum interior decreases. Because the draining of water from the drum remains constant, the water level 7 within the drum will drop until the thereby formed hydraulic head establishes an equilibrium between said flows of water. Then it is necessary to add water immediately to the fibrous suspension to maintain the consistency of the same constant. The difference between the water level 7 and the suspension level 8 can be measured with known means, e. g., by a float or by utilizing, during the rotation of the drum, the torque moment resulting from the position of the water level 7 and by taking this as an impulse for the measurement of consistency. Alternatively, the difference between the level of liquid outside the drum and the level of the filtrate within the drum may be measured by a device which includes a pair of air pipes 30, 31, the former leading into the drum and extending down into it to a level which will not interfere with the free rotation of the drum. The other air pipe 31 extends into the liquid exterior of the drum and has a free end which is at the same level as the free end of the air pipe 30. Both pipes are connected to a measuring device 32 which feeds air under pressure into these pipes so that the air will bubble very slowly through the open ends thereof. The measuring device serves to measure the difference between the counter or back pressures caused by the different liquid levels which prevail, respectively, interiorly and exteriorly of the drum. In this way, the difference in the liquid levels may very easily be determined.

Figs. 3–5 illustrate an embodiment of the invention adapted for use in measuring the quantity of solid matter in very dilute suspensions, e. g., for matter going to waste with drain water. Such a device consists of liquid discharge ducts 11 rigidly secured to sheet-like frames 10 and 10a. A part 14 of each duct is arranged to face an inner surface 13 of the screen 12 and is finished to coincide with the shape of the surface 13. Further, holes 15 are provided in the duct in the corner part thereof adjacent to the screen surface so as to facilitate withdrawal of liquid or air, depending on whether the duct is upwardly of downwardly positioned with respect to the surface 7. The periphery 10 is rigidly secured to a shaft 16, which at the end adjacent to a belt pulley 17 is directly mounted on a base plate 18. Arranged upon the shaft 16 is a tubular shaft 21 with inside box 19, said shaft being mounted on the base plate 18 by means of bearings 20 and adapted to carry a belt pulley 22. Rigidly secured to the shaft 21 is a sideplate 23 of the strainer drum which serves as mounting for the strainer drum which is provided with a screen 12. Secured to the upper surface of the screen 12 is a wire mesh 24, the conical perforations thereof permitting suspension liquid to pass into the strainer drum interior and out again above the level 8, the discharged liquid dislodging the layer or sheet 4 formed on the screen.

As is evident from the above description, the latter embodiment differs from the former in that the rotational speed of the liquid exit ducts and the rotational speed of the strainer drum can be regulated independently of each other. The strainer drum can therefore rotate with such speed as to permit the formation thereon of a layer affecting the permeability of liquid, in which case the internal water exit duct system must rotate with sufficient speed to permit liquid to discharge in amounts sufficient to form a hydraulic head between liquid levels to be measured and the consequent state of equilibrium.

We claim:
1. A device for measuring the percentage of solid matter suspended in a liquid comprising, in combination, a support; drum means rotatably mounted on said support and adapted to be partially immersed during rotation in a liquid containing suspended solid matter, the peripheral portion of said drum means including means for allowing the passage of a filtrate therethrough; means for rotating said drum means at a constant speed, whereby during such rotation when immersed in a liquid containing suspended solid matter, a filtrate enters said drum means through said peripheral portion thereof and the solid matter suspended in said liquid is deposited as a layer on the exterior of said peripheral portion of said drum means; and means responsive to rotation of said drum means at a constant rate for removing filtrate from the interior of said drum means at a constant rate, whereby an equilibrium condition is established when the filtrate enters said drum means at the same rate as it is removed from said drum means, the difference in levels between the liquid outside of said drum means and the filtrate within said drum means when said equilibrium condition is established being an indication of the concentration of solid matter in suspension in said liquid.

2. The combination defined in claim 1 wherein said means for removing filtrate include a plurality of vanes arranged interiorly of said drum means and form together with said peripheral portion thereof a plurality of scoops.

3. A device for measuring the percentage of solid matter suspended in a liquid comprising, in combination, a support; drum means rotatably mounted on said support and adapted to be partially immersed during rotation in a liquid containing suspended solid matter, the peripheral portion of said drum means including means for allowing the passage of a filtrate therethrough; means for rotating said drum means at a constant speed, whereby during such rotation when immersed in a liquid containing suspended solid matter, a filtrate enters said drum means through said peripheral portion thereof, at a constant volumetric rate, below the level of a liquid within which said drum means is partially immersed and the solid matter suspended in said liquid is deposited as a layer on the exterior of said peripheral portion of said drum means; and means responsive to rotation of said drum means at a constant rate for removing filtrate from the interior of said drum means at a constant volumetric rate, whereby an equilibrium condition is established when the filtrate enters said drum means at the same rate as it is removed from said drum means, the difference in levels between the liquid outside of said drum means and the filtrate within said drum means when said equilibrium condition is established being an indication of the concentration of solid matter in suspension in said liquid.

4. A device for measuring the percentage of solid matter in a liquid comprising, in combination, a support; a first drum rotatably mounted with respect to said support and adapted to be partially immersed during rotation in a liquid containing suspended solid matter, the peripheral portion of said drum including means for allowing the passage of a filtrate therethrough; a second drum rotatably mounted with respect to said support and located within said first drum for receiving the filtrate passing through the peripheral portion of said first drum; drive means connected to said first and second drums for rotating them at constant but different speeds, whereby during such rotation when said drums are partially immersed in a liquid containing suspended solid matter, a filtrate enters said first drum through said peripheral portion thereof and passes into said second drum and the solid matter suspended in said liquid is deposited as a layer on said peripheral portion of said first drum; and means responsive to rotation of said second drum at a constant rate for removing filtrate from the interior of said second drum at a constant volumetric rate, thereby removing the layer of solid material from the peripheral portion of said first drum at a constant rate dependent upon the constant rotational speed of said first drum, whereby an equilibrium condition is established when the filtrate passes through the peripheral portion of said first drum and into said second drum at the same rate as it is removed from within said second drum, the difference in levels between the liquid outside of said drums and the filtrate within said second drum when said equilibrium condition is established being an indication of the concentration of solid matter in suspension in said liquid.

5. A device for measuring the percentage of solid matter in a liquid comprising, in combination, a support; a first drum rotatably mounted with respect to said support and adapted to be partially immersed during rotation in a liquid containing suspended solid matter, the peripheral portion of said drum including means for allowing the passage of a filtrate therethrough; a second drum rotatably mounted with respect to said support and located within said first drum for receiving the filtrate passing through the peripheral portion of said first drum; drive means connected to said first and second drums for rotating them at constant but different speeds, whereby during such rotation when said drums are partially immersed in a liquid containing suspended solid matter, a filtrate enters said first drum through said peripheral portion thereof and passes into said second drum and the solid matter suspended in said liquid is deposited as a layer on said peripheral portion of said first drum; and means responsive to rotation of said second drum at a constant rate for removing filtrate from the interior of said second drum so that the filtrate flows through the peripheral portion of said first drum and back into the liquid containing suspended solid matter, thereby removing said layer of solid material from said peripheral portion of said first drum at a constant rate, whereby an equilibrium condition is established when the filtrate passes through the peripheral portion of said first drum and into said second drum at the same rate as it is discharged from said second drum, the difference in levels between the liquid outside of said drums and the filtrate within said second drum when said equilibrium condition is established being an indication of the concentration of solid matter in suspension in said liquid.

6. The combination defined in claim 5 wherein means for removing filtrate include a plurality of vanes arranged interiorly of said second drum and form together with the peripheral portion thereof a plurality of scoops.

7. The combination defined in claim 6 wherein said peripheral portion of said first drum is foraminated so as to permit the passage of the filtrate therethrough.

8. In a device for determining the relative value of the consistency of a fibrous stock of constant freeness, a drum with foraminated periphery and mounted to be rotated at a constant rate for filtering liquid thereinto from the stock and collecting fibrous matter thereon; means for rotating the drum at a constant rate; and means responsive to rotation of said drum at a constant rate for removing filtrate from the interior of said drum through said foraminated periphery thereof at a constant rate so that the filtrate flows into the stock through said foraminated periphery with the thereon collected fibrous matter, thereby effecting a hydraulic head between the level of stock outside the drum and the level of liquid within the drum, the said hydraulic head varying with the consistency of the stock.

9. A device for determining the relative value of the consistency of a fibrous stock of constant freeness, comprising, in combination, a vat having inlet, outlet and overflow means for receiving slowly flowing stock and maintaining said stock at constant level, a horizontal cylindrical screen covered drum immersed to less than half its diameter in said stock and mounted for rotation at a constant rate therein, said drum being adapted to collect a layer of fibrous matter on said drum screen surface and to receive therein liquid filtered through the fibrous layer on said drum screen surface, the thickness of said layer depending upon the consistency of the stock, means for rotating the drum at a constant rate, and means responsive to rotation of said drum at a constant rate for removing filtrate from the interior of said drum at a constant rate so that the filtrate flows through said screen surface with the thereon collected layer of fibrous matter into the said stock, whereby a hydraulic head is established between the level of stock outside the drum and the level of liquid within the drum, said head being adapted to vary with the thickness of the said layer of fibrous matter and the consistency of the fibrous stock.

10. A device for determining the relative value of the consistency of a fibrous stock of constant freeness, comprising a rotatably mounted screen covered drum for receiving liquid filtered from the stock and collecting fibrous matter on the screen surface thereof, means for rotating the drum at a constant rate, and a plurality of non-foraminous vanes in spaced relation between the wall ends of the drum and extending inwards from the said drum screen and forming an acute angle with the said drum screen, said vanes being adapted to form together with sections of the end walls and the screen a plurality of longitudinal buckets opening into the rotation direction for conveying liquid in the drum interior to a level above the surface level of the stock outside the drum and discharging said liquid through the screen with the thereon collected layer of fibrous matter into the said stock at a constant rate of liquid flow, said rate depending only on the dimensions of the buckets and the rotational speed of the drum, whereby a hydraulic head is effected between the surface level of the stock outside the drum and the surface level of the liquid within the drum, the said hydraulic head varying with the consistency of the stock.

11. In a device for determining the relative value of the consistency of a fibrous stock of constant freeness, a horizontal cylindrical screen covered drum mounted to rotate partly immersed in said stock for receiving liquid filtered from the stock thereinto and collecting fibrous matter on the screen surface thereof, means for rotating said drum extending outwardly and centrally from an end wall of said drum, and means within said drum and integral with said drum surface for discharging the liquid within the drum in reverse flow through said screen drum surface with fibrous matter collected thereon, said means comprising a plurality of bucket means so dimensioned that the lowest buckets are submerged in the liquid within the drum during operation.

12. A device for determining the relative value of the consistency of a very dilute fibrous stock, comprising, in combination, a vat having inlet, outlet and overflow means for receiving stock and maintaining the same at a constant level, a horizontal cylindrical screen-covered drum having an inner screen surface and immersed to less than half its diameter in said stock for collecting fibrous matter on the screen surface thereof, a second horizontal cylindrical drum within said first-mentioned drum and concentric therewith for receiving liquid filtered through the first mentioned screen, said second drum having a plurality of inwardly extending non-foraminous scoops in spaced relation therein for ejecting filtered liquid at constant rate through the screen surface of the outer drum with the layer of fibrous matter thereon into said stock, edges of said scoops at the outer periphery being snugly fitted to the inner surface of said first mentioned drum, means including shaft means extending outwardly and concentrically from the respective centers of two adjacent non-foraminous end walls of said drums for rotating said two drums at different speeds, the said constant liquid discharge rate depending only on the dimensions of the scoops and the rotation speed of the second drum, whereby a hydraulic head is effected between the surface level of the stock outside the said drums and the surface level of the liquid within the drum, the said hydraulic head varying with the consistency of the stock.

13. A device as set forth in claim 12 wherein each of said scoops is formed with an aperture therein adjacent to the screen of said screen-covered drum for venting air when said scoops submerge in the liquid within the drum.

References Cited in the file of this patent
UNITED STATES PATENTS

| | | |
|---|---|---|
| 1,840,101 | Jespersen | Jan. 5, 1932 |
| 1,945,988 | Witham | Feb. 6, 1934 |
| 2,442,888 | Cram | June 8, 1948 |